US008489657B2

(12) United States Patent
Shepherd et al.

(10) Patent No.: US 8,489,657 B2
(45) Date of Patent: Jul. 16, 2013

(54) KIOSK-BASED AUTOMATIC UPDATE OF ONLINE SOCIAL NETWORKING SITES

(75) Inventors: Michael D. Shepherd, Ontario, NY (US); Jennifer C. Perotti, Pittsford, NY (US); Dale Ellen Gaucas, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/595,116

(22) Filed: Aug. 27, 2012

(65) Prior Publication Data

US 2012/0324011 A1 Dec. 20, 2012

Related U.S. Application Data

(60) Division of application No. 12/638,357, filed on Dec. 15, 2009, now Pat. No. 8,275,767, and a continuation-in-part of application No. 12/546,044, filed on Aug. 24, 2009, now Pat. No. 8,290,999.

(51) Int. Cl.
  *G06F 17/00* (2006.01)

(52) U.S. Cl.
  USPC ........... 707/919; 707/918; 707/920; 707/728; 707/792

(58) Field of Classification Search
  USPC .......................... 707/728, 792, 918, 919, 920
  See application file for complete search history.

(56) References Cited

U.S. PATENT DOCUMENTS

| 6,032,004 A | 2/2000 | Mirabella, Jr. et al. |
| 6,343,317 B1 | 1/2002 | Glorikian |
| 6,526,351 B2 | 2/2003 | Whitham |
| 6,535,745 B1 | 3/2003 | Seraj |
| 6,622,020 B1 * | 9/2003 | Seki ............................ 455/456.2 |
| 6,926,203 B1 | 8/2005 | Sehr |
| 7,548,915 B2 * | 6/2009 | Ramer et al. ................ 705/14.54 |
| 7,911,335 B1 * | 3/2011 | Brady, Jr. .................. 340/539.11 |
| 2003/0055983 A1 | 3/2003 | Callegari |
| 2008/0102856 A1 | 5/2008 | Fortescue et al. |
| 2009/0054078 A1 * | 2/2009 | Golds .......................... 455/456.1 |
| 2009/0136226 A1 | 5/2009 | Wu et al. |
| 2011/0263219 A1 * | 10/2011 | Hasenfang et al. ......... 455/404.2 |

FOREIGN PATENT DOCUMENTS

| GB | 2454954 | 5/2009 |
| WO | 2008105766 | 9/2008 |

OTHER PUBLICATIONS

U.S. Appl. No. 12/546,044, Xerox, Office Action Communication, Aug. 10, 2011, pp. 1-8.
U.S. Appl. No. 12/546,044, Xerox, Office Action Communication, Jan. 9, 2012, pp. 1-7.

(Continued)

*Primary Examiner* — Sana Al Hashemi
(74) *Attorney, Agent, or Firm* — Gibb & Riley, LLC

(57) ABSTRACT

Systems and methods identify a current location of a user based on a known location of an electronic device including kiosk, beacon, or location-aware camera when the user interacts with the electronic device. The systems and methods automatically create a user status data file based on the known location. The user status data file contains data identifying that the user is currently at the known location and other data captured about the event or venue at that location. The systems and methods automatically upload the user status data file to a personal storage account which can then be used to post to a social networking web site associated with the user as an activity post associated with the user.

13 Claims, 7 Drawing Sheets

OTHER PUBLICATIONS

U.S. Appl. No. 12/546,044, Xerox, Notice of Allowance Communication, Jun. 13, 2012, 19 pages.
U.S. Appl. No. 12/638,357, Xerox, Office Action Communication, Feb. 8, 2012, pp. 1-5.
U.S. Appl. No. 12/638,357, Xerox, Office Action Communication, Mar. 9, 2012, pp. 1-17.
U.S. Appl. No. 12/638,357, Xerox, Notice of Allowance Communication, Sep. 26, 2012, pp. 1-15.

* cited by examiner

KIOSK-BASED AUTOMATIC UPDATE OF ONLINE SOCIAL NETWORKING SITES

CROSS REFERENCE TO RELATED APPLICATION

The present invention claims the benefit under 35 U.S.C. §120 as a divisional of U.S. Pat. No. 8,275,767, issued on Sep. 25, 2012, which is a Continuation-in-part of U.S. Pat. No. 8,290,999, issued on Oct. 16, 2012, which is fully incorporated herein by reference, and to which priority is claimed.

BACKGROUND AND SUMMARY

Embodiments herein generally relate to social networking sites and more particularly relate to computerized systems and methods that automate activity postings to social networking web sites through the ordinary use of media and status capturing devices.

Documenting one's experience at an event or venue is largely self-driven even with the ubiquity of digital cameras and cell phone applications. Digital photos, video, audio and other content are typically captured and managed entirely by the patron him or herself. Although there are existing methods for automating the capturing a patron's experience content and publishing to a personalized website, the content is still confined and localized for a specific application. The reuse, repurposing, and mashing up of the patron's experience content is still a difficult and a highly manual process.

Conventionally, for one to upload picture-based activity postings to social networking web sites, the user (social networker) is required to take or record picture, audio, and/or video; save such items to a file; and then perform additional steps to upload such items to their social network pages, chat rooms, etc. During such a process, the user can also add textual remarks or tags describing such uploaded items.

It is often cumbersome and time consuming to the social networker to coalesce electronic output such as audio, video, or picture files, then to edit or annotate the content, and then upload the content to social networking web sites. Therefore, many people do not interrupt their current activities to constantly update their social networking web sites with every current activity as they visit points of interest. Also, many people only periodically update their social networking sites at certain times (such as in the evening, after recording many such pictures, video, etc., previously during the day).

The embodiments herein address such obstacles to keeping social networking sites constantly updated with a system whereby physical devices, such as beacons or kiosks, are distributed throughout a venue or event, and through the unique identification of the patron, the system then sends their experience content to a personal cloud storage space for further use by numerous applications. The cloud storage space mentioned herein could refer to cloud storage, hosted storage, or any widely accessible simple storage service. The device contains pre-specified information about its location within a venue, and provides for identification of the patron. Experience content captured by the device is posted with its context and metadata to the patron's cloud storage account. The experience content is then automatically available for other systems to use—such as a social networking sites, tracking/reporting systems, print shops, RSS feeds, etc.

The embodiments herein provide automated computerized systems and methods that automate activity postings to social networking web sites simply through the ordinary use of media and status capturing devices, such as a beacon that may contain cameras, microphones, etc. With the embodiments herein, the user (social networker) merely needs to be identified by a device with a known location and their social networking sites will automatically be updated with media content and textual descriptions of the user's location and activities, without requiring any input from the user. Further, if the device takes or records audio, video, pictures, etc., such items will also be uploaded and automated text will be appended to such items, without any additional input from the user.

One generalized embodiment herein is a computer-implemented method that identifies a current location of a user based on a known location of an electronic device when the user interacts with the electronic device. The method automatically creates a user status data file based on the known location. The user status data file contains data identifying that the user is currently at the known location. The method automatically uploads the user status data file to a social networking web site associated with the user as an activity post associated with the user.

Another, more specific embodiment maintains at least one point of interest data file within a computer-readable storage medium. The point of interest data file maintains points of interest relating to a facility (such as an amusement park, a shopping mall, a conference center, a tourist location, etc.). This embodiment uses a kiosk or other similar electronic registration device located within the facility to allow a user to register. This registration authorizes one or more additional electronic devices (beacons, or other kiosks) to interact with the user while the user is within the facility.

This method identifies the current location of the user based on a known location of one of the additional electronic devices when the user interacts with the additional electronic device, using a computerized processor that is in communication with the computer-readable storage medium, the electronic registration device, and the additional electronic device.

Further, this method automatically creates a user status data file (using the computerized processor) based on the known location and the point of interest data file, the user status data file comprises data identifying that the user is currently at a point of interest corresponding to the known location. The method can also capture (using the additional device) video, still pictures, and/or audio simultaneously while identifying the current user location. The method can also automatically add the video, still pictures, audio, etc. to the user status data file. The method then automatically uploads the user status data file to a cloud storage space accessible by a social networking web site associated with the user. The social networking web site adds the content (location, captured media, etc.) as an activity post associated with the user, using the computerized processor.

The methods herein can also maintain, within the computer-readable storage medium, at least one textual data file that contains predetermined textual descriptions of the different points of interest of the facility that can be maintained within the point of interest data file. The method can then automatically merge the predetermined textual descriptions of the points of interest with an identification of the user (using the computerized processor) to produce a unique string of text describing the user at the point of interest. The method can then automatically add the unique string of text to the user status data file.

The embodiments can also comprise a computer-readable storage medium tangibly embodying instructions executable by a computer to perform the methods described herein.

A system embodiment herein is a computerized system that uses an electronic registration device operatively connected to (directly or indirectly connected to) a computerized processor. The registration device is located within the facility, and the electronic registration device receives a registration from a user. At least one additional electronic device is operatively connected to the electronic registration device and is also located within the facility. The registration authorizes the additional electronic devices to interact with the user while the user is within the facility.

The additional electronic devices identify the current location of the user based on a known location of the additional electronic device that the user interacts with. The computerized processor automatically creates a user status data file based on the known location. The user status data file contains data identifying that the user is currently at the known location. The computerized processor automatically uploads the user status data file to a social networking web site associated with the user as an activity post associated with the user.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, conventional systems require users to manually edit and annotate items and manually upload such items to social networking sites. For example, Web 2.0 applications such as microblogging, online/asynchronous discussions, and the sharing of photos, video clips, and music clips are largely manual processes for online social networkers. Due to their time consuming nature, such applications do not see their full potential as promotional tools for one's self, a business, an event, a community activity or service, a musical group, etc.

A cloud-enabled computing beacon or kiosk according to embodiments herein is a small stationary device that can be distributed throughout an event or venue. Each device has information about its specific location within the event or venue, as well as access to information about that event/venue. The beacon can include or be connected to one or more cameras that takes photos or videos of users at their request, as well as one or more microphones that allows users to add a voice and sound to the information that is transmitted to their account. Alternatively, mobile devices, such as cloud-enabled cameras or cameras that are wirelessly connected to a beacon or kiosk, could be used to automatically upload experience content to a user's cloud storage account.

The devices described herein automatically associate the captured experience content with context and metadata such as the device's location, the time of day, user specific context (such as birthdays, anniversaries, a speaking engagement, vacation, patron names) and other specific event activity (baseball opening day, 4th of July, space shuttle launch). This context and metadata is associated with the experience content persisted into the personal cloud storage account, either for personalization upon storage into cloud or for further personalization later by another system such as a social networking site, print shop, or other multi-media personalization system.

Figure 1:
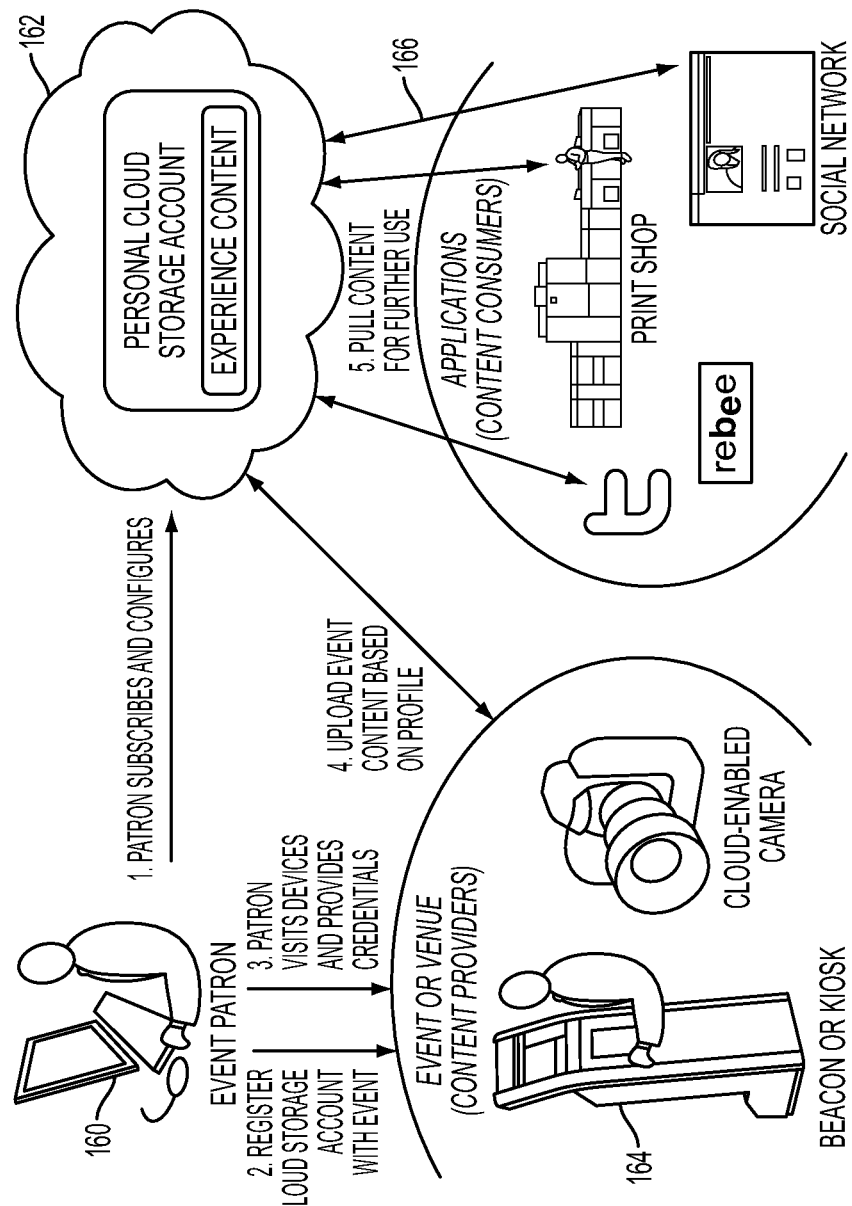
FIG. 1 is a schematic diagram of an exemplary system according to embodiments herein.

FIG. 1 illustrates an exemplary system according to embodiments herein. FIG. 1 illustrates an event patron 160; the various beacons, kiosks, cameras, etc. 164 that are utilized at an event or venue; the cloud environment 162 that maintains the personal cloud storage account of the user; and the various applications 166 that work through the cloud environment 162.

FIG. 1 also illustrates five steps (numbered 1-5) that can occur. In step 1, the patron subscribes to the system and configures their cloud storage account with their preferences. In step 2, the patron registers their cloud storage account with an event. In step 3, the patron visits the various beacons, kiosks, cameras, etc., and provides necessary credentials. In step 4, the venue or content provider uploads the event based on the user profile to the cloud storage account. In step 5, the various applications pull content from the cloud storage account to perform various operations as instructed by the patron.

Thus, upon a patron's registration to attend an event or venue (step 2) they can input credentials to allow the event access to their personal cloud storage account. Note that while the embodiments herein discuss a user's personal cloud storage account, such an account is not required for the embodiments herein. To the contrary, the venue could maintain a standalone system that can receive the patron's registration on site (or potentially allow pre-registration before the visit to the venue through, for example, the venue's web site). Further, such a standalone system could provide all the necessary services (printing services, posting services, etc.) that the personal cloud storage account can provide.

Thus, profile information is then either downloaded as configured in the cloud storage account or configured at time of registration. Subsequently as they attend the event/venue, the aforementioned devices 164 will automatically send the gathered experience content to the cloud account location(s) 166 specified within the customer's profile. Additionally, the device 164 may perform additional graphical or audio processing on the experience content before storing to the cloud, for example, personalizing a background image to read "Happy Birthday Mike" on a scoreboard.

Alternatively, event content can be uploaded to a personal cloud storage account without pre-registration. This would be done via patron identification at the device and include secure information for the device to access the patron's cloud storage account. In FIG. 1, step 2 would be skipped and account validation and verification would occur in step 3. The device 164 would then directly access the profile information from the cloud storage account. An example of this would be events that do not rely on pre-registration such as a spontaneous visit to the Empire State Building.

Patron credentials are gathered by an activity beacon or kiosk 164 via an identification mechanism, such as a cell phone, touchpad, voice, or radio frequency identification (RFID) card. Once the identification is made, the device has access to the information made available by the patron 160 at registration time, including any profile information. Credentials may also be securitized in a number of ways, including biometric scans, passwords, and/or pins. When RFID identification is used, upon registration for an event or venue, a patron 160 may produce a printable RFID tag on a printer enabled for RFID printing (if accessible) or the event may pre-print the RFID tags for preregistered patrons.

Many currently manufactured devices have built in wireless communication ability including Bluetooth®, wireless fidelity (Wi-Fi) communications, etc. In addition, many passive devices such as transducers, barcodes, etc., can be included within venue-specific identification cards provided to patrons. There are many other similar types of devices that can be utilized to easily identify the presence of an individual at a kiosk or beacon without requiring substantial cumbersome manual input by the patron. Such devices are well-known by those ordinarily skilled in the art and are readily available off-the-shelf products. Therefore, the details of such items are not discussed at length herein.

The embodiments herein are not limited to the foregoing devices and are intended to utilize any currently available (or future developed) mechanisms or processes that require only a minimal amount of patron activity to allow a kiosk or beacon to recognize the presence of the patron. For example, if biometrics, such as thumb print recognition technology, face recognition technology, etc., is improved beyond its current state, it also could be utilized to identify patrons, eliminating the need for the patron to carry an electronic device or identification card.

The embodiments herein provide a hardware and software platform that facilitates the development of social networking applications to promote entities such as businesses, events, community activities or services, charities, musical groups, etc. The embodiment herein automatically update a user's social networking site upon the user's "real world" interaction with a particular location or entity at a remote site through the use of identification and location tracking devices, and location-aware mobile devices such as cameras, mobile phones, and PDAs.

In social networking applications, there is generally an expectation of significant interaction with the user, often with the desirable result of the user to purchase credits in order to continue using the application. Another benefit of social networking sites is promotion—of one's self, a business, an event, a community activity or service, musical groups, etc. Users can become fans of other entities, thereby being able to receive news and join in the online discussions for a particular entity.

The embodiments herein address the time-consuming manual aspects of social networking applications by providing automated systems and methods to automate content updates on social networking websites. Specifically, the embodiments herein provide a socially-enabled experience capture platform (sometimes referred to as an experience capture platform) by which promotional entities can automatically update a user's social networking site upon the user's "real world" interaction with the particular entity.

The approach taken makes use of existing technology that is already being used to capture a patron's experience at a particular venue or event. Through the use of cameras for photo and video capture, microphones for audio capture, and other types of devices, a variety of information can be gathered to document the patron's experience. The systems described herein provide such a venue or event with an experience capture platform that easily creates a social networking application that connects the capture of the experience to the desired social networking site(s). Not only is the experience shared with the patron's friends in near real-time, the friends of the patron are able to view and comment on the experience. Given a mobile web-enabled device at the venue or event, the patron can interact with his friends while participating in the event.

Figure 2:
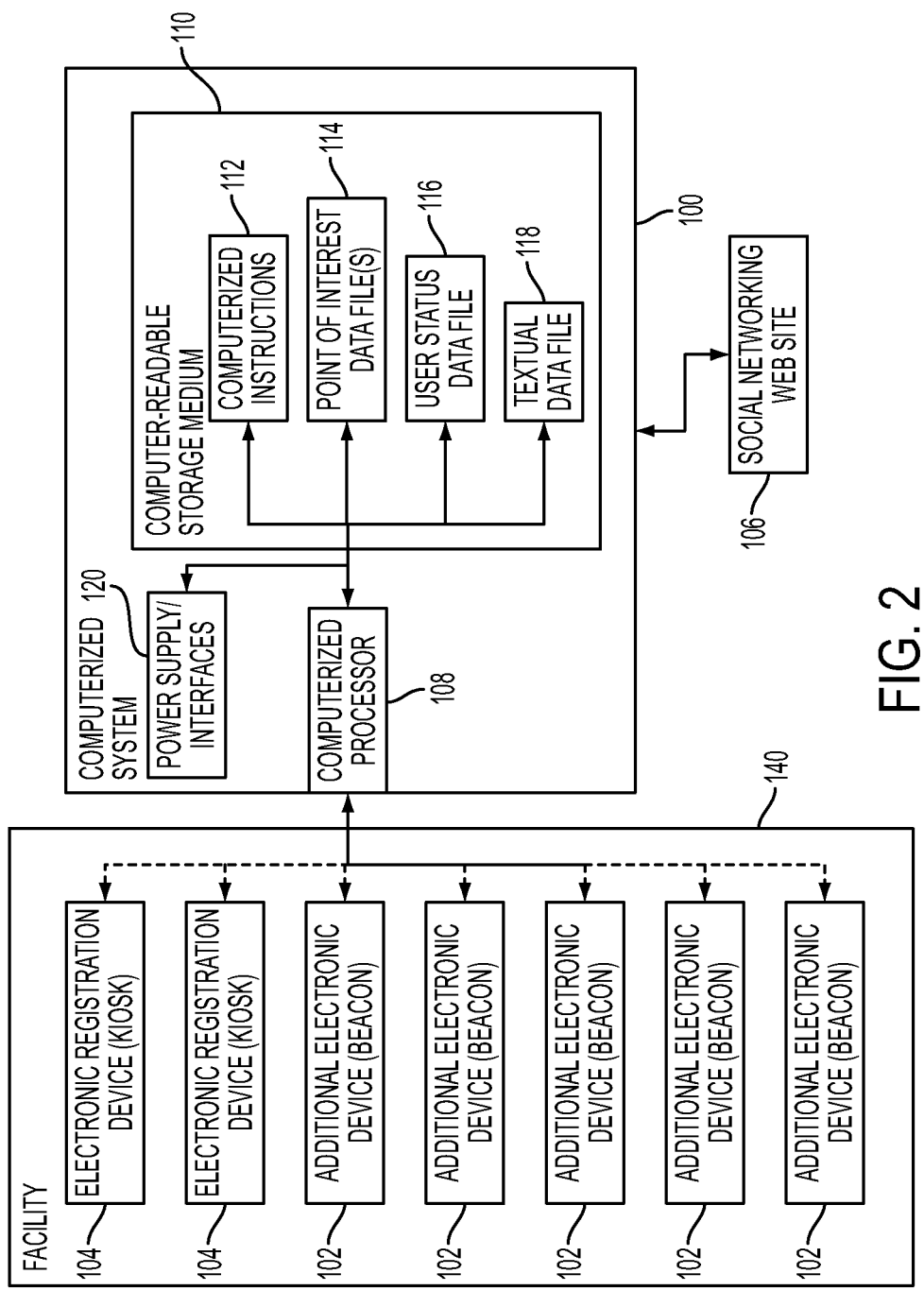
FIG. 2 is a schematic diagram of an exemplary system according to embodiments herein.

FIG. 2 illustrates one exemplary system embodiment. The system presented in FIG. 2 utilizes a computer-readable storage medium 110 that maintains at least one "point of interest" (POI) data file 114. The system has an electronic registration device 104 operatively connected to (directly or indirectly connected to) a computerized processor 108. The registration device 104 is located within the facility 140, and the electronic registration device 104 receives a registration from a user.

At least one additional electronic device is operatively connected to the electronic registration device and is also located within the facility. One or more electronic devices 102 (camera enabled cell phones, PDA's, etc.) that are in communication with a computerized processor.

The registration authorizes the additional electronic devices 102 to interact with the user while the user is within the facility. The additional electronic devices 102 identify the current location of the user based on a known location of the additional electronic device 102 that the user interacts with.

Such a processor can be located within the electronic devices 102 or can be the computerized processor 108 shown within a separate computerized system 100. Further, while certain components are shown as being within the computerized system 100 and other components are shown as being located within the facility 140, those ordinarily skilled in the art would understand that the various components shown in FIG. 2 could be at different locations. For example, the entire computerized system 100, or many components and therein, could be located within a cloud application or could be located within one of the electronic registration devices 104. Similarly, the electronic registration devices 104 could be combined with the additional electronic devices 102, and each kiosk could be a beacon/kiosk. In addition while a single computerized system 100 and a single computerized processor 108, storage medium 110, etc., is illustrated and discussed, those ordinarily skilled in the art would understand that many such systems and devices could be utilized with embodiments herein. Thus, FIG. 2 (and the other drawings accompanying this application) are merely examples of how the embodiments herein could be implemented, and are not intended to limit the ways in which the embodiments herein can be implemented.

The computerized processor 108 automatically identifies a current location of a user when an appropriate identification card or other similar item is carried or possessed by the user (or an employee of a vendor escorting the user). The electronic devices 102 are in wired or wireless communication with the computerized system 100 through a local area network or wide area network (such as private networks or the Internet) as indicated by the dashed lines.

The computerized system 100 can be one or more devices that are physically or logically connected to one another (such as in a cloud environment). The electronic devices 102/104 identify the user and provide media and status for its associated point of interest. Such elements or devices include a computer-readable storage medium 110 that can comprise one or more physical devices, such as electronic storage, magnetic media storage, optical storage, etc. and various necessary elements, such as power supply, physical connections interfaces, etc., 120. The computer readable-storage medium 110 can store (tangibly embody) many files such as computerized instructions or computer programs 112, associated data, etc. Such instructions or programs 112 are executed by processors, such as the computerized processor 108, to perform the various methodologies and functions described herein.

The computerized processor 108 (which is directly or indirectly in communication with the computer-readable storage medium 110) automatically creates a file entry in the user status data file 116 when the user's presence is identified by one of the beacons 102. The user status data file 116 comprises data identifying that the user is currently at the point of interest corresponding to the location of the beacon 102. The computerized processor 108 then automatically uploads the user status data file 116 to a social networking web site 106 associated with the user as an activity post associated with the user.

The computer-readable storage medium 110 can optionally maintain at least one textual data file (which can include database entries) 118 comprising predetermined textual descriptions of the points of interest maintained within the point of interest data file 114. The vendor's point of interest's specific information is stored in the point of interest data file 114 and textual data file 118. While a textual description of the user's current location is provided as an example of an item that can be included within the user status data file 116, such textual descriptions are not required. For example, graphical items such as map location identifiers of the points of interest, previously stored pictures of the points of interest, previously stored logos of the points of interest etc., can be added to the user status data file 116 instead of, or in addition to any predetermined textual descriptions of the points of interest.

The computerized processor 108 can automatically merge the predetermined textual descriptions of the points of interest with the name (or some other identification) of the user to automatically produce a unique string of text describing the user at the point of interest. The computerized processor 108 automatically can add this unique string of text to the user status data file 116. Therefore, with embodiments herein, the user need merely register and appear before a beacon in order to have textual descriptions of their current location created and uploaded to their preferred social networking sites, and the user does not need to take any other action to maintain their virtual presence with their friends.

The electronic devices 102 (position-known cameras, microphones, etc.) can capture video, still pictures, and/or audio simultaneously while identifying the current user's location. The computerized processor 108 can also automatically add the video, still pictures, audio, etc., to the user status data file 116. Therefore, the user's social networking page(s) 106 can be automatically updated, without requiring any additional input from the user. This reduces the cumbersome nature of conventional systems and allows users to more frequently update their social networking sites and to update their social networking sites in real time, without any additional effort.

A collection of point of interest data files 114 and user status data files 116 and textual data file associated with the point of interest 118 can be represented in a data repository or content management system.

Figure 3:
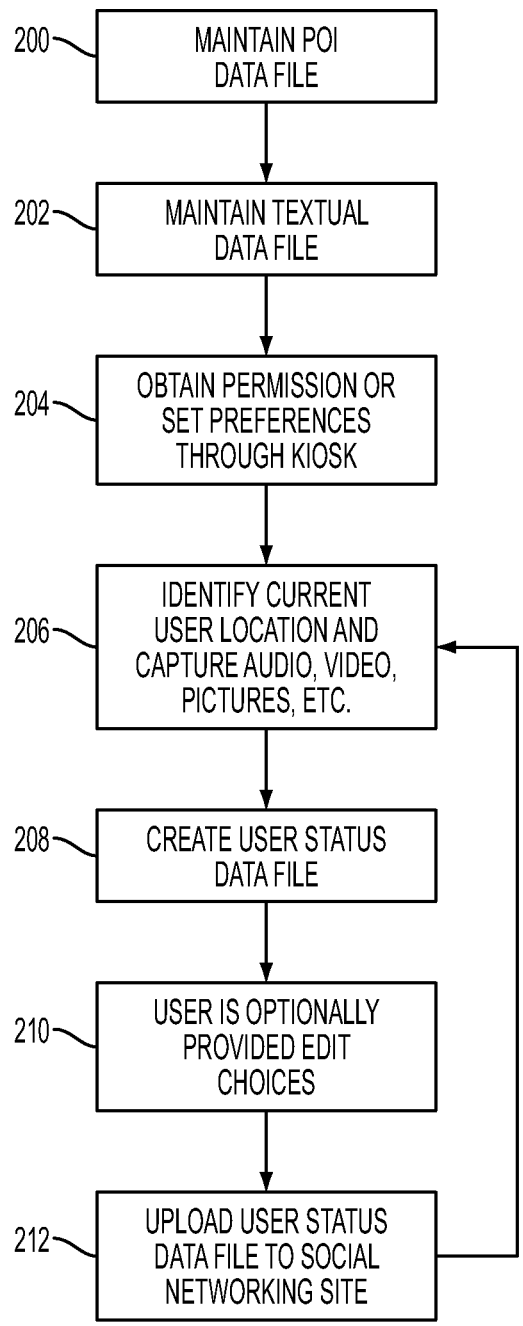
FIG. 3 is a flowchart illustrating embodiments herein.

FIG. 3 is a flowchart illustrating various method embodiments herein. More specifically, in item 200 of FIG. 3, using a vendor-offered service as an example, one computer-implemented method herein maintains at least one point of interest data file comprising points of interest (potentially associated with a vendor) within a computer-readable storage medium. The point of interest data file can maintain points of interest relating to a facility (such as an amusement park, a shopping mall, a conference center, a tourist location, etc.).

As part of the process of maintaining the POI data file, in item 200, the embodiments herein allow vendors and other parties to register various points of interest, thereby allowing the POI data file to be continuously updated. In addition, as shown in item 202, embodiments herein can optionally maintain (also within the computer-readable storage medium) at least one textual data file that comprises predetermined textual descriptions of the points of interest maintained within the point of interest data file. Textual descriptions of the points of interest may be also updated continuously by vendors and other parties.

As mentioned above, the vendor can obtain permission from the customer/user to capture images, audio, etc., and update the user's social networking web sites in item 204. One embodiment uses a kiosk or other similar electronic registration device located within the facility to allow the user to register. This registration authorizes one or more additional electronic devices (beacons, or other kiosks) to interact with the user while the user is within the facility. The user can also (or alternatively) set their preferences in item 204 as described in greater detail below.

In item 206, the method automatically identifies the user's current location based on a known location of one of the additional electronic devices when the user interacts with it, or based on a geographic positioning feature of an electronic device (e.g., camera, PDA, cell phone, etc.) that is carried by the user's guide (vendor's employee) or is carried by the user/customer. Also, simultaneously while identifying the current user location in item 206, the method can optionally capture video, still pictures, and/or audio, etc.

As shown in item 208, this embodiment automatically creates a user status data file (using the computerized processor) based on the known location and the point of interest data file. The user status data file contains data identifying that the user is currently at a point of interest corresponding to the known location of the beacon.

When utilizing the embodiments herein, a user has the option to have their current location associated with one or more of such point of interest data files. The user status data file created in item 208 stores geographic data identifying that the user is currently at the point of interest associated with the vendor and can automatically add the textual description of the geographic location to the user status data file.

For example, with respect to the optional textual description added to the user status data file in item 208, the embodiments herein can automatically merge the predetermined textual descriptions of the points of interest with an identification of the user (user name, user screen name, etc.) using the processor to produce a unique string of text describing the user at the point of interest. For example, if the user's name was Tom and the point of interest Tom was visiting was the Big Wave Slide within an amusement park, this user identification can be added to the previously prepared textual description "<UserID> is at the Big Wave Slide" to create a unique string of text: "Tom is at the Big Wave Slide." This unique string of text is automatically added to the user status data file. This process of creating the user status data file 208 can also automatically add the video, still pictures, and/or audio, etc., captured in item 206 to the user status data file to potentially show Tom at the Big Wave Slide.

In item 210, the used can optionally be provided some editing choices through the kiosks 104 scattered throughout the venue. For example, in item 210, the user can be allowed to add or remove text, pictures, audio, video, etc., from the previously automatically prepared user status data file. Thus, once a user status data file has been created, the user can be provided some form of notice that the automatically prepared user status data file is ready to be uploaded and the user can optionally be provided a yes/no choice of whether to edit the file. If the user declines to edit the file or finishes editing the file, it will then be automatically uploaded. Alternatively, the user may set their preferences to never edit the file contents, in which case the user status data file would skip step 210 and upload directly to their personal cloud storage area.

More specifically, after creating and editing the user status data file in items 208 and 210, the embodiments herein then automatically upload the user status data file to a social networking web site associated with the user (as an activity post associated with the user), possibly via the user's personal cloud storage space, using the computerized processor in item 212. Note that, item 210 is purely optional and if the user does not provide any editing input, the status data file is still complete and ready to be uploaded as an activity post about the user. The user data file may pass through a personal cloud storage space before being uploaded to the social networking site. Many of the foregoing processes are optional. Thus, for example, the process discussed above can be generalized so that the method merely identifies a current location of a user based on a known location of an electronic device when the user interacts with the electronic device. The method automatically creates a user status data file based on the known location. The user status data file contains data identifying that the user is currently at the known location. The method automatically uploads the user status data file to a social networking web site associated with the user as an activity post associated with the user.

As shown above, the processes herein perform such automated tasks using a computerized processor that is in communication with the computer-readable storage medium and that is in communication with the electronic device.

Therefore, embodiments herein automatically prepare and upload activity posts about the user to the social networking site, without the user having to take any action (other than carry their identification card or portable device). If the user (or the vendor) takes pictures, records video, etc. those items will also be added to the user status data file automatically, without any action other than simply taking the pictures, recording the video, audio, etc.

With embodiments herein there is no need to take any action to create or edit the user status data file and no need to take any action to upload the user status data file as the entire process is automated (although the user can review or edit any activity posts before they are actually uploaded). Since the embodiments automate all steps required to create and upload an activity post to a social networking site, the user's satisfaction with the point of interest and the social networking site increase dramatically because they can satisfy their desire to be constantly connected to their online community, without having to take time away from their reality-based activity.

As mentioned above, the user can set their preferences in item 204, which provides safeguards to the user to maintain user privacy. Therefore, in item 204, the user can identify (through various menu driven options on the portable device) when and how often automated activity posts will be generated about them. For example, the creation of user status data files can be limited to certain days, certain times of the day, certain geographical locations, certain frequencies (once an hour, etc.), etc. The user can also toggle on or off the features described herein at various kiosks to only allow user status data files to be created when the user explicitly allows them. In addition, in item 204 the user can edit generically created point of interest files or textual data files (items 200 and 202) to more closely match their personal style. Further, the user can limit which social networking sites will receive the posts of the user status data files in item 204. While some preferences are mentioned herein, as would be understood by those ordinarily skilled in the art, these preferences are merely examples and many other preferences can be selected in item 204.

Although the capabilities of social networking sites are continually growing, types of automatic updates that are capable with the embodiments herein include the following. The embodiments herein can automatically create a new photo album and upload pictures to the album documenting the user's experience. Via similar technologies that enable the Facebook Mobile photo uploader application, Facebook API calls are used such as photos.createAlbum, photos.upload, and photos.addTag, to update the patron's site with pictures captured at the event. Similarly, audio clips and video clips can also be captured and shared.

Additionally, uploaded pictures to social networking and photo sharing sites are notorious for incorrect and confusing tagging. Often, people will upload a set of pictures and tag the entire set as one which leads to pictures that don't contain the elements which the tag denotes. Such an automated system of embodiments herein can more accurately tag the shared pictures.

The embodiments herein can perform status updates in various intervals and granularity; for instance, from posting generic status such as "Michael is touring the Metropolitan Museum of Art in New York City", to posting more specific status updates such as "Michael is touring the Buddhist Paintings exhibit at the MET". Also, when particular events or actions occur during the visit, a status update can be made such as "Michael just became a member of the Metropolitan Museum of Art". Numerous third-party applications can be utilized to further the electronic experience. For instance, a Facebook third-party application "Cities I've Visited" can be updated to automatically place a pin on the city of the venue or event.

As all these different types of updates are made by embodiments herein to the desired social networking portal in real time, the patron's friends can add comments, also in real time, to the patron's social networking site. Then, via any mobile web-enabled device (at the point of interest, the patron may receive feedback and suggestions for enhancing their particular experience. For instance, in response to the automatic status update of "Michael is touring the Buddhist Paintings exhibit at the MET", one of Michael's friends can post "Hey, I was just there last week. Be sure to check out the Buddhist meditation garden."

Figure 4:
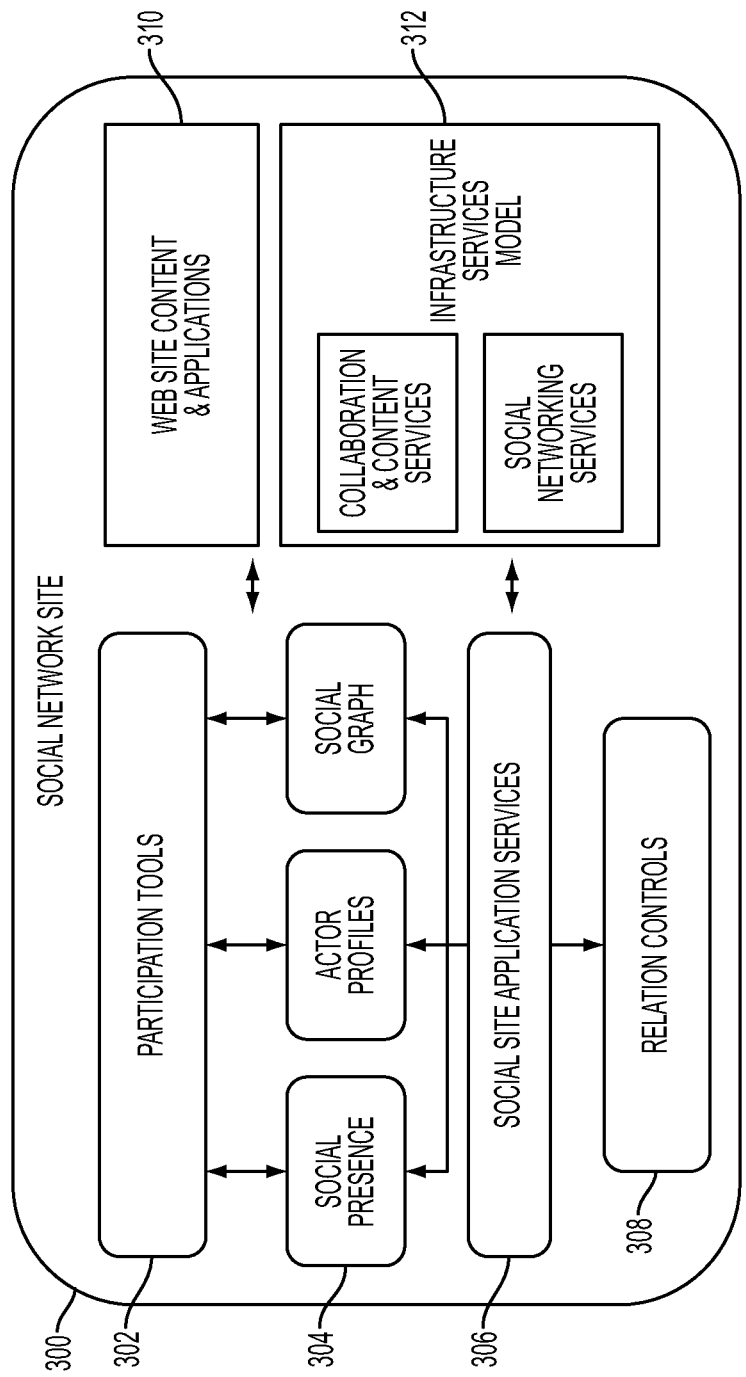
FIG. 4 is a schematic diagram of an exemplary social networking system according to embodiments herein.

FIG. 4 depicts a social networking site 300 that supports new applications. It includes, for example, participation tools 302; societal items 304 such as social presence, actor profiles, and social graph; social site application services 306; and relation controls 308. The web site content and application are shown as item 310 and the infrastructure services model is shown as item 312 and is shown to include collaboration and content services as well as social networking services. The computerized system 100 interacts with social networking site 300 through the site's advertized infrastructure services 312.

In order to use the point of interest's application built on such an experience capture platform, the patron must first allow the application access to their social networking site (item 204, above). Before attending the point of interest, the patron can use a remote computer, mobile device, or local computer to allow the application to access and modify their activity content as well as allow offline access so that it may update content while the patron is not actively on the social networking site.

Figure 5:
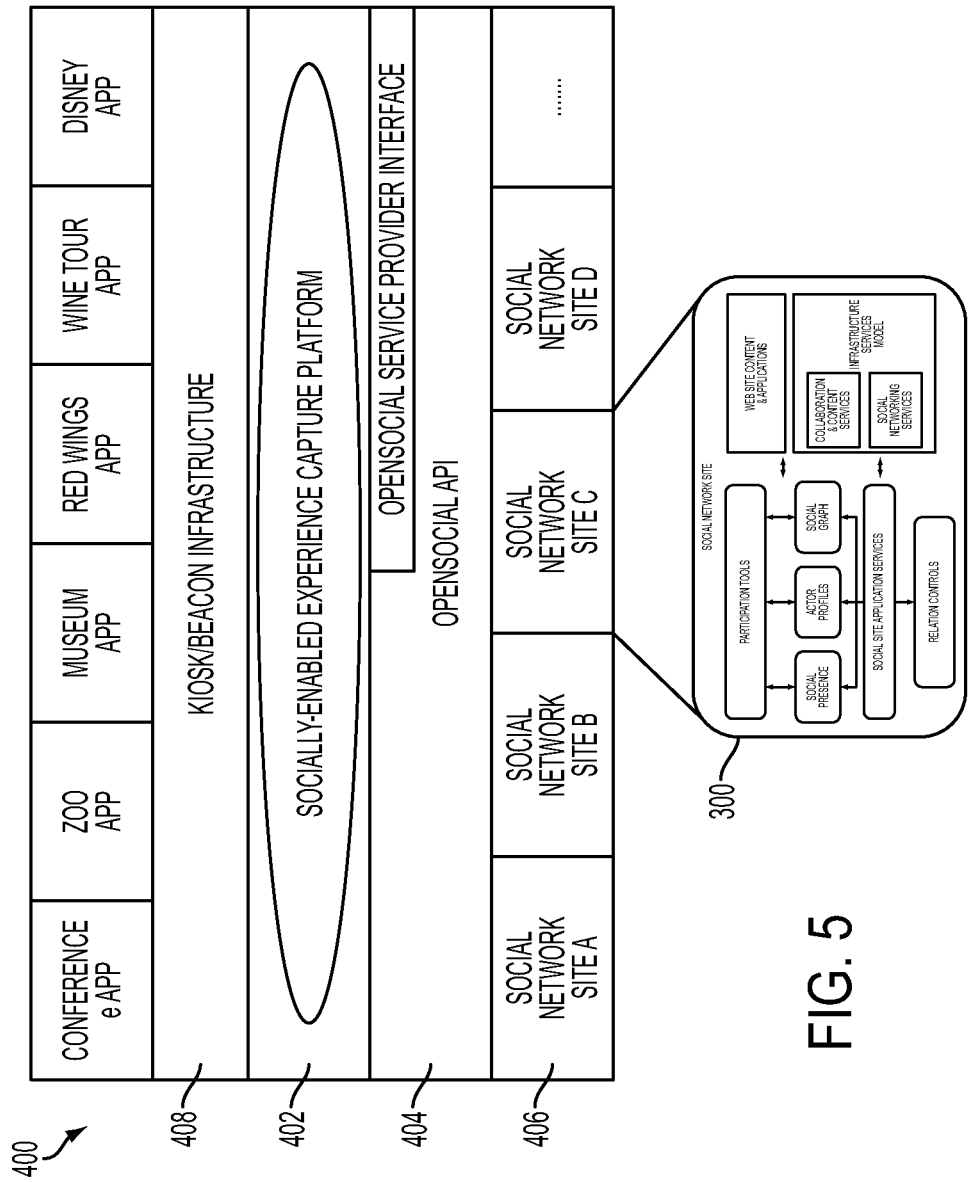
FIG. 5 is a schematic diagram of an exemplary system according to embodiments herein.

The platforms of embodiments herein enable a variety of social networking applications 400 to be easily built and deployed, as shown in FIG. 5. These include, but are not limited to, a conference application, a zoo application, a museum visit application, a baseball game visit application, a wine tour application, a theme park visit application, etc. A kiosk/beacon infrastructure 408 provides the capabilities for the applications to interface with the user at various locations throughout the particular facility 140. The experience capture platform 402 provides the capabilities of the computerized system 100 described herein and provides a high-level interfacing layer (as shown expanded in FIG. 6). The experience capture platform is built on top of social networking application programming interface (API) 404, which may include, but is not limited to, the OpenSocial API. The social networking API 404 is in communication with many of the social networking services 406 such as the one 300 depicted in FIG. 4 (e.g. Facebook, LinkedIn, MySpace, etc.).

Figure 6:
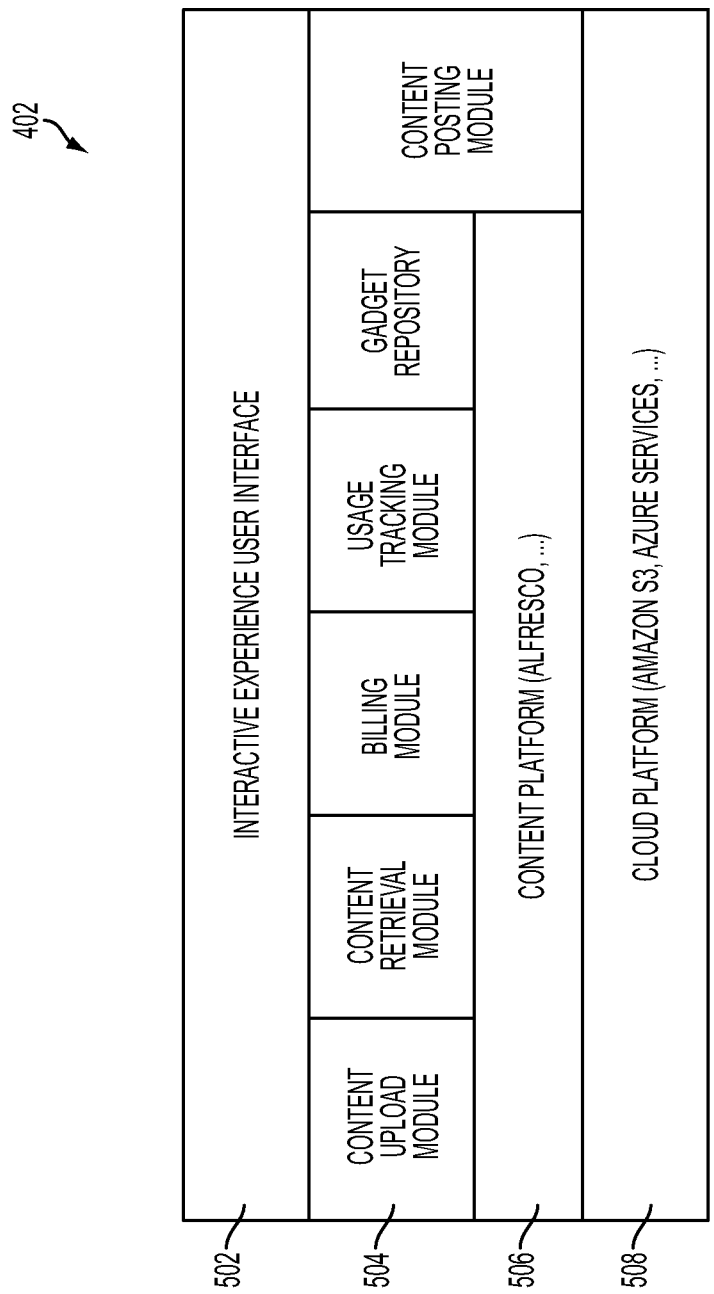
FIG. 6 is a schematic diagram of an exemplary system according to embodiments herein.

FIG. 6 illustrates the socially-enabled experience capture platform 402 shown in FIG. 5 in greater detail. The socially-enabled experience capture platform 402 includes an electronic experience user interface 502 that allows the user to provide input, such as those described above. Various modules 504 are provided including a content upload module (used to upload and maintain files such as the point of interest file 200 and the textual data file 202); content retrieval module (used to retrieve data from files such as, but not limited to, the point of interest file 200 and the textual data file 202); billing module (used by a vendor to bill the user for services provided by the embodiments herein, potentially on a pay-per-use basis); usage tracking module (used to determine the amount a user is billed and to determine usage statistics); a gadget repository (the gadgets are discussed below); and a content posting module (used to upload the user status data file 212). The content platform 506 can be any intermediate software used to support such modules.

The socially-enabled experience capture platform is presented in the form of, but not limited to, a Platform as a Service (PaaS) or Cloudware 508 with no need for software downloads, installation, or IT managers. By leveraging existing computing infrastructure and content management system technologies, the point of interest registration, management, and interoperability with user activity is persisted using known methods and systems.

Figure 7:
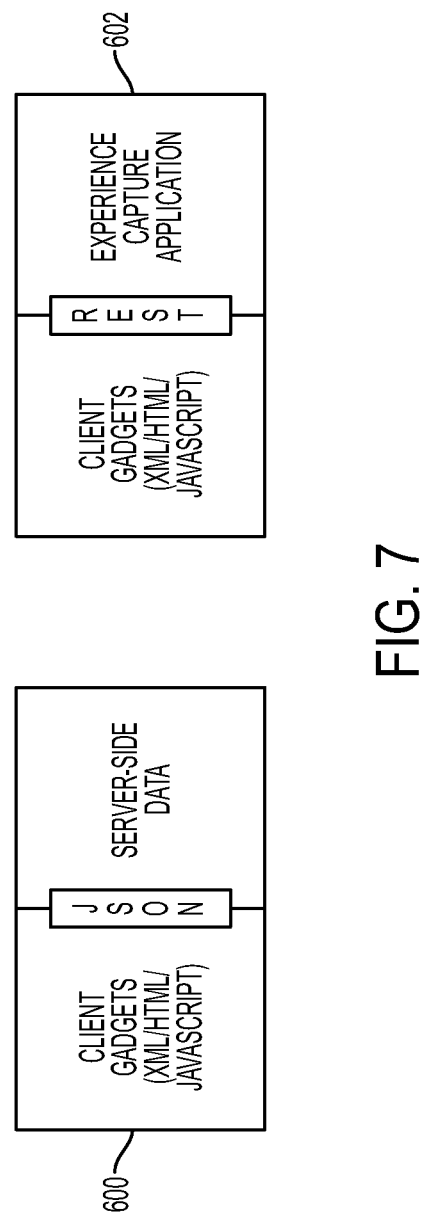
FIG. 7 is a schematic diagram of exemplary gadgets according to embodiments herein.

The infrastructure for gadget and server interoperability is provided by the experience capture platform. The platform offers prebuilt gadgets which simply require configuring in order to gather desired data. Two such gadgets are illustrated in FIG. 7 one with server side data 600 and the other with an experience capture application according to embodiments herein 602.

Client-side gadgets in 600 and 602 serve as lightweight mechanisms to present an application's view in a modular way. Gadgets typically appear embedded in a web page or on a desktop. For example, JSON (JavaScript Object Notation) available from Sun Microsystems, Santa Clara Calif., USA is a lightweight data-interchange format for client applications that pulls dynamic data from a server with little or no need for behavioral control from the server. A REST (REpresentational State Transfer) interface provides for a more robust server-side application (HTTP used for data and session tracking, SOAP used for messaging) in which a social networking server-side application, such as OpenSocial, can perform more process intensive tasks to drive the gadget.

Some features of this platform include that it has easy-to-configure client gadgets for data feeds including audio/video stream, metadata, audio/video clips, etc. Further, embodiments herein provide easy-to-configure repository access in which to upload experience content for publishing to social networking sites. The embodiments herein incorporate multiple social-networking sites to share experience content simultaneously. Embodiments herein have the ability to draw from other web-based services to enhance experience content published to social networking sites, can use a pay-per-use billing model, can collect usage data to determine the value of services provided, and have near-infinite scalability.

With embodiments herein, various use cases are possible. For example, in a first use case, user subscribes to a personal cloud storage account and receives a means for identification and authorization. The user can have their own authorization mechanism to the cloud storage account or a separate authorization may be provided to content providers, such as the venues and events, which allows them to provide the experience content and metadata. Alternatively, the cloud storage account may be separately configured to permit pre-registered events and venue to provide the content. Similarly, a separate authorization also takes place for content consumers, such as social networking sites, print shops, personalization applications or other types of content streams.

In a second use case, profiles are established in the cloud storage account in order to provide structure and rules for how the experience content is stored by the event or venue. The profile provides the logic in which the persistence, organization, and management of the content is done. Permissions can be automatically set on the uploaded content depending on the profile configuration.

In a third use case, the user registers their cloud storage account with selected events or venues to act as content providers. This may be done remotely such as at a home or work computer or via an internet browser, or done locally at the event with a mobile phone, kiosk, or other means. Profile information is either downloaded as configured in the cloud storage account or configured at time of registration. A profile for managing the experience content is then assigned for that event or particular device from the storage account. Alternatively, users can register with specific devices and profile information is retrieved from the cloud storage account at that time or default profile information can be used.

In a fourth use case, the user optionally registers their cloud storage account with content consumers (print shops, social networks, microblogs, etc.) that can manipulate and/or republish the experience content. In a fifth use case, the user participates in the selected event or venue, their experience is captured throughout their visit via beacons, kiosks and other content entry devices. In a sixth use case, the captured experience content is optionally manipulated by the event or venue to make quality adjustments, add personalization, include advertisements, watermarks, and/or other identifying markings, or any other preprocessing before uploading to the cloud storage account. In a seventh use case, experience content is sent to the cloud storage account per the profile provided at registration.

In an eighth use case, content consumers may immediately respond in an event-driven manner to further manipulate and/or republish content, such as to a social networking site, photo sharing site, microblog, or other streaming media. Alternatively, content consumers may at some later time perform an action with the experience content, such as a print shop accessing a new set of experience content in the cloud storage account, then personalizing, printing, finishing, and shipping a memory book of the provided content. Optionally, the user can visit their cloud storage account to manipulate content before it becomes available to content consumers.

The embodiments herein are illustrated using the following non-limiting examples. The first example or scenario is a user posting an amusement park experience to a social networking account. In this example, a user (Amy) has a personal cloud storage account and elects to allow Funtime Amusement Park to capture her family's visit. She also elects to allow Facebook to pull content from the cloud storage account and post to her Facebook activity stream. A profile is made that specifies the structure of folders in the storage account, the type of contents for each folder, and types of metadata to apply to the uploaded content. The amusement park contains activity beacons throughout the park which document a patron's activities such as going on a ride, watching a show, playing a game, encountering theme park characters, etc. Upon check-in at the park, Amy's family receives RFID card(s) which uniquely identifies them. While standing in line for a ride, Amy pairs her card with the beacon located at the entrance of the ride. Upon pairing her card with the beacon, she can choose to have the beacon take her family's picture. She can also record a voice note using the beacon's microphone. The beacon takes her picture and inserts it, together with any voice notes, into a pre-specified template containing the name of the ride, the family's name, date and time, ride details and/or interesting statistics about the ride (i.e.—Amy was the 45th customer to ride on this ride). During the ride, a second beacon takes a photo of the family during the ride—likely at a particularly scary or exciting portion of the ride—perhaps this time for a small fee. The content for this ride are uploaded to Amy's cloud storage account, upon which Facebook is notified to post the content to Amy's activity stream.

Over time, Amy pairs her card with numerous activity beacons throughout the park. Upon returning from the amusement park, Amy visits her cloud storage account and finds new content containing her experience at the park. Each beacon that she visited transmitted a page of information and pictures from the activity that it represented. The content is listed in chronological order, documenting the exact path that Amy took through the park. An experience history may be provided that captures the family's visit to the park—10 am Rode water ride; 12 pm—Ate lunch at Frank's Bistro; 2 pm—Watched acrobatics show, etc. Amy can also review the time when her son got lost in the park and his ability to activate the nearest beacon and notify her of his whereabouts.

A second example or scenario is the creation of an ad-hoc trip report at a conference. In this example, a user (Jim) is attending the Chi conference this year, and is expected to submit a trip report when he returns to the office. When he registered for the conference, Jim specified his beacon profile information. For this conference, he decided to have the conference beacons post their information to a particular folder in his cloud storage account. When he checks into the conference, his conference name tag includes an RFID chip, which contains his profile information. As he attends various talks throughout the conference, he pairs his name badge with the beacon just inside the door of the talk, and the beacon transmits a beacon page that includes the abstract for the talk, a picture of the speaker, and other information about the talk like the time, date, and number of attendees.

When he returns to the office, Jim finds a document in his personal folder of his cloud storage account that contains the beacon pages that were transmitted during the conference. The pages are sequenced in chronological order, reflecting the order of the talks that Jim attended. Jim glances through the document and adds a few notes to some of the talks that he found particularly interesting. In a short while, the trip report is ready to submit.

A third scenario for example is beacon "geocaching." One unique feature of the activity beacon is their physical location, and the fact that they contain information relevant to their specific location. This aspect of the devices can be leveraged to make them attractive to "beacon collectors." Since users have to actually visit the beacon to collect the information contained within it, users could begin to collect experience beacon information. They could increase their status within their group of friends or colleagues by demonstrating that they visited a specific beacon location. Also, one could envision games like treasure hunts that could be played with the activity beacons.

A fourth scenario is a memory book. A couple may hold their wedding at a particular church. Professional photographers and videographers may be hired for the event. The church does not have beacons or kiosks, but the professional cameras are "cloud-enabled" such that they can send captured wedding content to the couple's cloud storage account. Handwritten and voice-recorded wedding well-wishes can be captured and also sent to the cloud account. Upon completion of the event, a print provider is granted access to the couple's cloud account to design, personalize, print, and fulfill a hardcopy memory book which they ship to a list of people specified in a print order.

A fifth scenario involves devices not related to an event. A tourist in New York City may spontaneously decide to visit the Empire State Building. There could be an activity beacon available at the top of the building for taking people pictures with a NYC skyline background. The tourist registers directly with the beacon to send experience content to their cloud storage account and specifies profile information such that the content is associated with the current NYC trip.

Additionally, previous friends or other users of the social network that have already visited the venue or event may wish to expose this fact to their friends or the public. Then when a patron visits the experience capturing point of interest, they may access the experience content from people who visited before them. A voting thumbs-up/thumbs-down mechanism may be used which conveys the recommended or not-recommended aspects of venue or event. Voting may also be captured by the point of interest's social networking embodiments herein to easily know which elements of the event are favorable and which are not.

With embodiments herein creation of a new application for a particular entity does not require any software development expertise. The experience capture platform described herein contains all pieces necessary for easy setup, configuration, and actuation of gadgetry. Content of a patron's experience may be added to the content management system both manually and automatically. From a manual perspective, venues who have set up their own application on this platform may map a client desktop system to the content management system for dragging and dropping desired content to appropriate locations. Alternatively, more sophisticated venues can develop software that automatically feed a patron's experience content to the content management system. Venues such as theme parks, which already have mechanisms for pushing user experience content to their own content management systems for building personal web pages and other artifacts for their patrons, can similarly push the same content to their social networking application built on this platform.

Upon setup and configuration, the promotional entity for a point of interest decides the type of content they would like to feed to the online social networking site. When conveying the type of content, say through a configuration user interface, a content management repository template can be auto-generated by the experience capture platform which then links the desired content to the social networking site as described above. Users can easily and automatically document the details of their experience at an event or venue in a format that is useful and easily shareable with friends, family, or colleagues. The cloud storage account provides the scalability and ubiquitous access for numerous types of systems to act as both content providers and content consumers.

With embodiments herein, the hosts of the kiosks, beacons, and other devices benefit from greater visibility by having the details of their venues or events distributed to the friends of patrons who use these cloud-enabled devices. Also, content consumers such as a print shop can be authorized to access a new set of experience content in the cloud storage account, and then personalize, print, finish, and ship a memory book of the provided content.

Thus, as shown above, the embodiments herein providing a cloud-enabled device as distributed throughout an event or venue, which transmits a patron's content relevant to the context of the event or venue. The patron's content is made available for automatically processing into a wide variety of different presentations. Further, with embodiments herein, the patron has complete control of his event experience content, while at the same time, maintaining the content's ubiquity, semantic description (including tagging), and ease of use.

The embodiments herein automatically update an online social networking site that captures a person's experience and provide a system that enables a point of interest to create and configure its own social networking application without need for software or programming expertise, by using a content management system to invoke a workflow that provides content to a social networking site.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A computer-implemented method comprising:
maintaining at least one point of interest data file within a non-transitory computer-readable storage medium, said point of interest data file maintaining points of interest relating to a facility;
receiving a registration from a user using an electronic registration device located within said facility, said registration authorizing at least one additional electronic device to interact with said user while said user is within said facility;
identifying a current user location of said user based on a known location of said additional electronic device when said user interacts with said additional electronic device, using a computerized processor that is in communication with said computer-readable storage medium, said electronic registration device, and said additional electronic device;
automatically creating a user status data file using said computerized processor based on said known location and said point of interest data file, said user status data file comprising data identifying that said user is currently at a point of interest corresponding to said known location; and
automatically uploading said user status data file to a social networking web site associated with said user as an activity post associated with said user, using said computerized processor.

2. The computer-implemented method according to claim 1, further comprising capturing, using said additional device, at least one of video, still pictures, and audio simultaneously while identifying said current user location.

3. The computer-implemented method according to claim 2, said creating of said user status data file comprising automatically adding said at least one of video, still pictures and audio to said user status data file.

4. The computer-implemented method according to claim 1, further comprising maintaining, within said computer-readable storage medium, at least one textual data file comprising predetermined textual descriptions of points of interest maintained within said point of interest data file.

5. The computer-implemented method according to claim 4, further comprising automatically merging said predetermined textual descriptions of said points of interest with an identification of said user using said computerized processor to produce a unique string of text describing said user at said point of interest, said creating of said user status data file automatically adding said unique string of text to said user status data file.

6. A computerized system comprising:
a computerized processor;
an electronic registration device operatively connected to said computerized processor and located within a facility, said electronic registration device receiving a registration from a user; and
at least one additional electronic device operatively connected to said electronic registration device and located within said facility, said registration authorizing said additional electronic device to interact with said user while said user is within said facility, said additional electronic device identifying a current user location of a user based on a known location of said additional electronic device,
said computerized processor automatically creating a user status data file based on said known location,
said user status data file comprising data identifying that said user is currently at said known location, and
said computerized processor automatically uploading said user status data file to a social networking web site associated with said user as an activity post associated with said user.

7. The computerized system according to claim 6, said additional device capturing at least one of video, still pictures, and audio simultaneously while identifying said current user location.

8. The computerized system according to claim 7, said computerized processor automatically adding said at least one of video, still pictures and audio to said user status data file.

9. A computer-implemented method comprising:
maintaining at least one point of interest data file within a non-transitory computer-readable storage medium, said point of interest data file maintaining points of interest;
receiving a registration from a user using an electronic registration device, said registration authorizing at least one additional electronic device to interact with said user;
identifying a current user location of said user based on a known location of said additional electronic device when said user interacts with said additional electronic device, using a computerized processor that is in communication with said computer-readable storage medium, said electronic registration device, and said additional electronic device;
automatically creating a user status data file using said computerized processor based on said known location and said point of interest data file, said user status data file comprising data identifying that said user is currently at a point of interest corresponding to said known location; and
automatically uploading said user status data file to a social networking web site associated with said user as an activity post associated with said user, using said computerized processor.

10. The computer-implemented method according to claim 9, further comprising capturing, using said additional device, at least one of video, still pictures, and audio simultaneously while identifying said current user location.

11. The computer-implemented method according to claim 10, said creating of said user status data file comprising automatically adding said at least one of video, still pictures and audio to said user status data file.

12. The computer-implemented method according to claim 9, further comprising maintaining, within said computer-readable storage medium, at least one textual data file comprising predetermined textual descriptions of points of interest maintained within said point of interest data file.

13. The computer-implemented method according to claim 12, further comprising automatically merging said predetermined textual descriptions of said points of interest with an identification of said user using said computerized processor to produce a unique string of text describing said user at said point of interest, said creating of said user status data file automatically adding said unique string of text to said user status data file.

* * * * *